United States Patent [19]

Slovinsky et al.

[11] Patent Number: 5,385,772

[45] Date of Patent: Jan. 31, 1995

[54] PRESSURE-SENSITIVE ADHESIVE SYSTEMS WITH FILLER

[75] Inventors: Manuel Slovinsky, Sao Paulo, Brazil; Jeffrey R. Tarizzo, Tacoma, Wash.; Dennis K. Fisher; Brian J. Briddell, both of Jackson, Mich.

[73] Assignee: Adco Products, Inc., Michigan Center, Mich.

[21] Appl. No.: 657,889

[22] Filed: Feb. 19, 1991

Related U.S. Application Data

[63] Continuation of Ser. No. 428,204, Oct. 27, 1989, abandoned, which is a continuation-in-part of Ser. No. 245,510, Sep. 19, 1988, abandoned.

[51] Int. Cl.⁶ .................. B32B 7/12; C08L 33/06; C08L 33/08
[52] U.S. Cl. .................... 428/220; 428/355; 428/327; 428/345; 525/229
[58] Field of Search ............ 428/343, 345, 355, 327, 428/220; 525/229

[56] References Cited

U.S. PATENT DOCUMENTS

| | | | |
|---|---|---|---|
| Re. 24,906 | 12/1960 | Ulrich | 206/59 |
| 2,753,285 | 7/1956 | Pahl et al. | 154/53.5 |
| 2,907,682 | 10/1959 | Eichel | 117/122 |
| 2,925,174 | 2/1960 | Stow | 206/59 |
| 2,956,904 | 10/1960 | Hendricks | 117/93 |
| 3,314,838 | 4/1967 | Erwin | 156/71 |
| 3,328,194 | 7/1967 | Kasper | 117/62 |
| 3,331,729 | 7/1967 | Danielson et al. | 161/162 |
| 3,502,497 | 3/1970 | Crocker | 117/68.5 |
| 3,661,618 | 5/1972 | Brookman et al. | 117/62 |
| 3,690,937 | 9/1972 | Guse et al. | 117/122 |
| 3,725,115 | 4/1973 | Christenson et al. | 117/93.31 |
| 3,729,338 | 4/1973 | Lehman et al. | 117/122 |
| 3,772,063 | 11/1973 | Fukukawa et al. | 117/93.31 |
| 3,840,448 | 10/1974 | Osborn et al. | 204/159.14 |
| 4,038,454 | 7/1977 | Lehmann et al. | 428/356 |
| 4,049,483 | 9/1977 | Loder et al. | 156/230 |
| 4,098,945 | 7/1978 | Oehmke | 428/327 |
| 4,181,752 | 1/1980 | Martens et al. | 427/54.1 |
| 4,223,067 | 9/1980 | Levens | 428/308 |
| 4,243,500 | 1/1981 | Glennon | 204/159.12 |
| 4,303,485 | 12/1981 | Levens | 204/159.24 |
| 4,329,384 | 5/1982 | Vesley et al. | 428/40 |
| 4,364,972 | 12/1982 | Moon | 427/54.1 |
| 4,415,615 | 11/1983 | Esmay et al. | 428/40 |
| 4,612,242 | 9/1986 | Vesley et al. | 428/313.9 |
| 4,636,432 | 1/1987 | Shibano et al. | 428/352 X |
| 4,666,771 | 5/1987 | Vesley et al. | 428/325 |
| 4,710,536 | 12/1987 | Klingen et al. | 524/493 |
| 4,749,590 | 6/1988 | Klingen et al. | 427/54.1 |
| 4,818,610 | 4/1989 | Zimmerman et al. | 428/345 |
| 4,855,170 | 8/1989 | Darvell et al. | 428/343 X |
| 4,950,537 | 8/1990 | Vesley et al. | 428/343 X |

OTHER PUBLICATIONS

Bueche, Physical Properties of Polymers, pp. 108–111 (1962) Interscience Publishers.

Kirk-Othmer, Encyclopedia of Chemical Technology, Third Edition, vol. 23, Thyroid and Antithyroid Preparations to Vinyl Polymers, pp. 828–831 (1983).

*Primary Examiner*—Daniel R. Zirker
*Attorney, Agent, or Firm*—Joan I. Norek

[57] ABSTRACT

There is provided an adhesive system comprised of a pressure-sensitive adhesive matrix having dispersed. therein organic particulate solids having a particle size no greater than 300 microns, and generally no greater than 225 microns, which matrix may have at least one, and generally two, sides coated with an unfilled pressure-sensitive adhesive material, which adhesive materials generally may be acrylic materials. Such adhesive system is one generally provided as a sheet, including elongated tapes, having a thickness of from about 25 to 60 mils.

3 Claims, No Drawings

PRESSURE-SENSITIVE ADHESIVE SYSTEMS WITH FILLER

This is a continuation of copending application(s) Ser. No. 07/428,204 filed on Oct. 27, 1989 now abandoned, whichis a continuation-in-part of Ser. No. 07/245,510, filed on Sep. 19, 1988, now abandoned.

TECHNICAL FIELD OF THE INVENTION

The present invention is in the technical field of pressure sensitive adhesives, and in particular supported pressure sensitive adhesive systems.

BACKGROUND OF THE INVENTION

Pressure sensitive adhesives are widely used for a multitude of purposes, such as various sealing and attachment applications. Attachment applications generally utilize adhesive systems faced on both sides with adhesive material, which generally include some type of support material between the two adhesive coatings. Such support material in instances is a relatively thin plastic film, which is often used in applications for bonding sheets of paper or thin cardboard together and the like. For attachment of larger objects, or where the surfaces being bonded together, or one of them, is contoured or uneven or textured to a degree, supported adhesive systems having a more substantial thickness are generally more useful. Such more substantial thickness, together with some degree of elasticity, provides some conformity of the sheet or tape to the surface(s) being bonded, permitting the adhesive coating to more universally contact such surface(s) along the entire length and breadth of the sheet or tape being applied.

Many applications require durability of the adhesive bond. Such durability is desired whenever the objects being bonded will be subjected to stress during the period in which the continued bonding is desired. For instance, a wall-mounted plaque is under the constant stress of the force of gravity and further may be accidently jolted or impacted, or a furniture item with segments bonded together may have substantial stress operative at that bond during.normal use. One area in which pressure-sensitive adhesive bonding is considered highly desirable, despite the critical need to optimize the durability of the bond provided thereby, is the attachment of automotive trim items, such as automobile side-moldings,.insignia, and the like. There is a trend in the automotive industry against mechanical attachments of such items involving perforation of the vehicle body, because such perforations may create corrosion problems, particularly for vehicles which under normal use can otherwise be expected to be used for many years. In addition, the use of pressure-sensitive adhesive bonding, if such can be applied with reasonable ease, permits the trim items to be selected and applied after the vehicle leaves the place of manufacture. Given the normally-encountered stresses on such type of attachment, including besides gravity various impact or tearing stresses, and given the environmental conditions that a typical vehicle is subjected to, the adhesion, and continued adhesion, and durability of such form of attachment is extremely important.

Moreover, a pressure-sensitive adhesive system suitable for attachment of automotive vehicle trim, and other applications where like durability is desired, .... should not merely be initially adhesive and cohesive, but also maintain, and preferably improve in, such properties with the passage of time. Adhesive systems that initially deform to conform to the substrate(s) but then tend to revert from such deformation place additional stress upon the bond and decrease in. durability with time, and thus are not desirable for long-term durable attachments. It has been found that the adhesive and cohesive and time and environment durability properties vary with the nature of the support material used, and hence such support material is contributing to the system beyond its function as a carrier.

It is an object of the present invention to provide a pressure-sensitive adhesive system of the supported type that provides adhesion and durability advantageous for automotive trim attachment applications and other application requiring similar or less adhesion and durability characteristics, and preferably such an adhesive system wherein such characteristics are enhanced with the passage of time. These and other objects and advantages of the present invention are described below.

DISCLOSURE OF THE INVENTION

The present invention provides an adhesive system with filler which is comprised at least of a support material in which the filler is-included and preferably the adhesive system further includes an unfilled, pressure-sensitive coating over at least a portion of the support material. The support material is comprised of a pressure-sensitive adhesive matrix and, dispersed therein, organic particulate solids having a particle size in the range of from 1 to 300 microns. In preferred embodiments the org&nic particulate solids have a particle size within the range of from 1 to 225 microns. The organic particulate solids must be compatible with, or inert towards, the pressuresensitive adhesive matrix or any precusor of such matrix that comes in contact with the solids. In any instance when the support material's preparation is completed by U.V. irradiation of a prepolymerized mass to which the organic particulate solids have been added, the solids must neither impede the U.V. initiated polymerization nor be soluble in or absorbed by the prepolymerization material.

In preferred embodiment, the organic particulate solids comprise from 1 to 25 weight percent of the support material. In further preferred embodiment, the filler is a polymeric composition.

In preferred embodiment, the support material is formed as a sheet, including elongated tapes, having a thickness of from 25 to 60 mils, and more preferably from 25 to 50 mils., and the pressure-sensitive coating(s) have a thickness of from 0.5 to 10 mils, and more preferably from 1 to 6 mils.

In further preferred embodiment, the adhesive system iS formed as a three-layer laminate, having a sheet of support material faced on both sides with a pressure-sensitive adhesive coating.

In more detail, the organic particulate solids improve the adhesive and cohesive properties of the adhesive system and other properties desired for an adhesive system useful for durable applications. In certain of the Examples herein, such properties are demonstrated in comparison to similar adhesive systems prepared without the organic particulatessolids filler.

In other preferred embodiment, the organic particulate solids comprise from 5 to 15 weight percent of the support material based on total weight of the support material, that is, the adhesive matrix and the organic particulate solids. Wherein the adhesive system is comprised of such matrix and organic particulate solids, without any adhesive coating(s) thereon, this and the above weight percent ranges of the organic particulate solids are, of course, weight percent ranges based on the entire weight of the adhesive system.

PREFERRED EMBODIMENTS OF THE INVENTION

The organic particular solids useful as fillers for the adhesive system of the present invention are compositions that are divisible into discrete particles of appropriate size and be free flowing at the temperature(s) employed when the solids are being combined with the adhesive material to form the filled support material. As noted above, such solids further must be inert to the adhesive matrix and any precusor thereof that contacts the solids. Organic compositions that provide to the adhesive system the advantages of the present invention include polyethylene, polyvinyl acetate, polyvinyl alcohol, cellulose, polyacrylamide, partially hydrolyzed polyacrylamide, ethylene-vinyl acetate copolymers and the like. Organic polymers of sufficient molecular weight and of appropriate composition to be inert to a prepolymerized mass of pressure-sensitive adhesive material, such as the above-noted polymers, are particularly preferred. From these examples it is seen that the polymer may be comprised of hydrocarbon monomers, carbohydrate monomers, or mixtures thereof, or of monomers containing other elements such as nitrogen; the polymers may have backbone chains comprised of carbon-to-carbon linkages or other types of backbone chains, such as the heterocyclic D-glucose units of cellulose which are joined together by glycoside linkages to the C-4 of the next unit. While most of the above noted polymers have a glass transition temperature of above 25° C., and hence would not be elastic solids at ambient room temperature, polyethylene has a lower glass transition temperature, and as seen from the examples given below, its elastic nature does not interfere with its performance as a filler within the present invention. The improvement in adhesive and cohesive properties that is imparted to the adhesive system of the present invention is, however, not derived from the presence of particulate solids of greater adhesive character than the matrix at the surface of the matrix. To the contrary, the particulate solids in the context of the present invention should be substantially uniformily dispersed in the matrix, the adhesion and cohesion improvements are seen when the bond(s) to the substrate is between the unfilled adhesive coating and the substrate, and such improvements are provided using as the filler polymers having high glass transition temperatures such as polyvinyl acetate having a glass transition temperature of about 40° C., or partially hydrolized polyacrytamides, which would have glass transition temperatures between that of polyacrylic acid (106° C.) and polyacrylamide (165° C.). A sufficient molecular weight of the polymer to avoid solration in a prepolymerized mass of pressure-sensitive type mixture of monomers is believed to be 500 or higher. The polymeric compositions useful for fillers in the present invention may have no pendant groups, such as polyethylene, or have one or more diverse types of pendant groups, such as amide, hydroxy, carboxylic acid, carboxylic acid ester, nitrile, and the like.

The organic particulate solids may be sieved prior to incorporation into the support material to assure that the portion used has the desired particle size range. It is believed that a minor portion of filler may be particles larger than the desired maximum of 300 microns, preferably 225 microns, without deleterious effects on the adhesive system, provided that such larger particles do not comprise more than 15 weight percent of the total filler, and are not of such great size that they interfere physically with the adhesive system of the present invention. It is believed that particulate solids having particle sizes in excess of 15 mils could interfere physically with adhesive system even at very low levels.

The organic particulate solids may be a single species or a mixture of various compositions. Solids that tend to clump together, forming excessively large particles, under the conditions employed when incorporating the filler into the support material, would be unsuitable.

It is desirable to select a filler that is available commercially in a form that requires no processing prior to its incorporation into the support material of the adhesive system. To avoid sieving the organic particulate solids a filler supplied with a fine and fairly uniform grind is desirable. To avoid drying before use, a filler having a low moisture content, preferably less than 1.0 weight percent, is desirable. For instance, a spray-dried polyvinyl acetate powder sold under the tradename Vinac RP-251 by Air Products and Chemical, Inc., has such desirable characteristics.

The support material, or carrier, of the adhesive system, may further include a thixotropic agent,. such as a hydrophilic silica, which when added to a prepolymerization precursor imparts a thixotropic characteristic thereto and has been found to facilitate a uniform dispersion of the filler therein prior to fixing the distribution of the filler by the completion of the polymerization. Such an agent, for instance a silica, is useful when employed in amounts of from 0.5 to 5.0 weight percent, and preferably in amounts of from 1.0 to 3.0 weight percent.

The polymers of the adhesive system of the present invention are generally cross-linked polymers having at least a degree of pressure sensitive adhesiveness. Such polymers preferably may be formed in major part from a combination of acrylic acid esters and ethylenically-unsaturated monomers containing at least one polar moiety. The acrylic acid ester monomers are preferably acrylic acid esters of alcohols having from 1 to 14 carbon atoms, which alcohols may be primary or secondary, and the carbon chains thereof may be linear, branched, cyclic, heterocylic, or aromatic, and may be further substituted. Such acrylic acid ester monomers should be, in major portion, chosen from those that provide pressure sensitive adhesive properties to the polymer, such as acrylic acid esters formed from such alcohols as n-butanol, isobutanol, n-pentanol, isopentanol, 2-methylbutanol, 1-methyl pentanol, 3-methyl pentanol, 2-ethyl butanol, 3-heptanol, n-octanol, 3,5,5-trimethylhexanol, isooctanol, 2-ethylhexanol, 3-ethylhexanol, 4-ethyl-heptanol, 4-methyl-octanol., isodecyl alcohol, and the like. The esters may be also, in major portion, a combination of acrylic esters chosen from those formed from low carbon atom containing alcohols and higher carbon atom containing alcohols from among those that provide pressure sensitive adhesive properties to the polymers. In a preferred embodiment, the polymer(s) of the adhesive system are comprised of from 55 to 95 mole percent, and more preferably from 65 to 90 mole percent, of acrylic acid esters of $C_{4-10}$ primary or secondary alcohols.

The term "unit" as used herein refers to a segment of the adhesive system polymer containing two adjacent backbone carbons, formed by the polymerization of an ethylenically-unsaturated monomer, and hence is a polymer segment formed from a given monomer.

The ethylenically-unsaturated monomers having a polar moiety incorporated into the polymer(s) of the adhesive system include such monomers as acrylic acid, itaconic acid, maleic anhydride, B-carboxyethylacrylate, acrylamide, acrylonitrile, cyanoethylacrylate, hydroxyalkylacrylates, N-substituted acrylamides, similar methacrylic monomers, and the like. Such polar moietycontaining monomers may be incorporated into the polymers of the present adhesive system in the amount of from 5 to 45 mole percent of the units of such polymer(s), and in preferred embodiment from about 15 to 30 mole percent.

As mentioned above, such polymer(s) are generally cross-linked and particularly suitable as cross-linking agents are molecules having a plurality of ethylenically-unsaturated sites capable of polymerization with other monomers being incorporated into the polymer(s). Of such type of agents, di- and triacrylates, such as 1,6-hexanediol diacrylate, are particularly suitable. The polymers can of course be cross-linked with other types of cross-linking agents, such as those that react with a plurality of the polymer's pendant functional groups, bridging same, or the incorporation into the polymer of small amounts of monomers having coreactive groups. When simple agents, such as 1,6-hexanediol diacrylate, are used, the amount of cross-linking agent desired in a given formulation is generally about from 0,005 to 0.5 weight percent, based on total weight of polymer, and preferably about 0.01 to 0.2 weight percent. Less triacrylate cross-linking agent is generally desirable in comparison to a diacrylate.

The support material of the adhesive system of the present invention may be formed by extruding a combination of polymer and filler, by casting from a solvent that contains the polymer (dissolved) and the filler, or by U.V. initiated polymerization of a monomer blend, or prepolymerized monomer blend, containing the filler. The adhesive coating may be formed by similar methods. In preferred embodiment both the support material and adhesive coating(s) are formed by U.V. initiated polymerization, generally as follows. The desired monomers, exclusive of the cross-linking agent, in the presence of a photoinitiator, are first prepolymerized to a degree sufficient to provide a flowing mass of convenient viscosity, and then transferred to an apparatus for completion of the polymerization, with the addition of cross-linking agent and generally additional photoinitiator, whereat the viscous prepolymerization material, together with such additives, and for the support material the filler also, is sandwiched between two'sheets, both of which are release coated, and at least one of which transmits U.V. light, and the material is held between such sheets at the desired thickness, while exposed to U.V. radiation for completion of the polymerization. For the adhesive coating(s), one of the sheets preferably is a preformed sheet of the'support material, and hence the adhesive coating's prepolymerization material is in direct contact with the surface of the support material during completion of the coating's polymerization. Such preferred method of forming the adhesive system of the present invention is described more fully below in Examples 1 and 2.

Such polymerizations are conducted in the absense of oxygen, which condition can be provided by purging the atmosphere over the polymerization mixture with nitrogen, and when a prepolymerized material is sandwiched between surfaces such technique itself sufficiently eliminates oxygen.

In Examples 1 and 2 below there is prepared an adhesive system containing an anionic polyacrylamide filler. As to embodiments with polyacrylamide fillers, a preferred embodiment of the present invention includes as a filler a polyacrylamide that is from 0 to 80 mole percent hydrolyzed, which range includes an acrylamide homopolymer (0 mole percent hydrolyzed) to an acrylic acid/acrylamide copolymer having an 80/20 mole ratio (80 mole percent hydrolyzed) which may also be designated an 80 mole percent anionic polyacrylamide. In more preferred embodiment, such filler is a 5 to 45 mole percent hydrolyzed polyacrylamide.

The following are descriptions of the test procedures used in some of the Examples. The adhesive systems were tested as strips or tapes comprised of the support material coated on both sides With the nonfilled adhesive coating. Such tapes are about 12.7 mm wide. The testing was conducted at room temperature unless stated otherwise.

Peel Test: A strip of the adhesive tape (about 150 mm in length) is applied to a primed polyvinyl chloride bar (test bars using XPll-289-A1, Lynn Plastic, The Standard Products Company, Dearborn, Michigan, shaped so that it can be gripped by a Tester for pulling away from a painted panel), followed by one pass of a 6.8 kg weighted roller on the tape side. The tape liner is then removed from the tape and the tape, with the polyvinyl chloride bar, is applied to a steel panel coated with an exterior finish automotive paint, followed by two passes (in the same direction) on top of the polyvinyl chloride bar with a 6.8 kg weighted roller. The Tester is designed for a 90° pull angle upon displacement of a moving platform to which the steel panel is attached. The grip moves at a speed of about 12 inches per minute. The Tester includes a recorder which records force versus the distance travelled. In this test two parameters are determined. First is the force required to start the breaking of the bonding of the polyvinyl chloride bar to the steel plate, which is called the Peel "breakaway" force or "Initial Breakaway Peel". The The second parameter determined is the force needed to continue the breaking of the bond along the length of the bond after initial breakaway, which is called the Peel "continuous" force or "Initial Continuing Peel".

Pluck Test: The pluck test differs from the peel test generally in that only about one inch length of the adhesive tape is used and hence-only a one inch segment 0f the polyvinyl chloride bar is bonded to the steel panel. Only one parameter is determined, which is the force required to pluck the bar away from the steel panel. The pull of the Tester is again at about a 90° angle and the grip is displaced at a speed of about 2.5 cm per minute.

Creep Test: The creep test differs from the peel test in that the polyvinyl bar is attached to the steel panel so as to leave about a 12.7 mm overhang, and then a 72 hour dwell period is allowed, after which a 1000 gram weight is attached to the overhanging section of the bar. The panel is then supported in a vertical position in an oven at 70° C. for 96 hours, after which the weight is removed, and the panel and bar are permitted a further 72 hour dwell time at room temperature. The creep displacement is then measured.

The tensile strengths of the adhesive system tapes were determined using the ASTM D412 test procedure. In some instances, the adhesive system was tested only aftera period of "dwell", whereby the steel plate and PVC bar were bonded together with the adhesive system tape and then left so bonded for a period of time before tested. Such dwell may be at room temperature or other than room temperature, the latter to determine the.effect of such .temperature of bond strength. Similarly the tests can be conducted at room temperature or at other than room temperature.

The above described tests are particularly appropriate for determining the adhesion and durability of the adhesive system for the purposes of its use for attaching automotive exterior trims. In addition, such tests demonstrate the adhesion and durability of the bond provided by the adhesive system generally, and further the advantageous improvement in properties provided by the filler incorporated into the support material of the system.

EXAMPLE 1

To an erlenmeyer flask was charged a mixture for preparing a prepolymerized material, which mixture, in parts by weight, was 60 parts butyl acrylate, 30 parts 2-ethylhexylacrylate, 10 parts acrylic acid, and as a photoinitiator 0.2 parts benzoin i-propyl ether. The flask was equiped with a magnetic stirring bar and purged with nitrogen. Thereafter during the entire prepolymerization procedure a nitrogen blanket was maintained over the reaction mixture. The flask was placed on a magnetic stirrer to provide stirring during the prepolymerization procedure. UV radiation was provided by a long wave lamp, Spectronic XX-15N equiped with two 15 watt tubes, positioned at the side of the flask, and the irradiation was continued until the charge reached a viscosity of about 3,000 cps, as Brookfield viscosity. To this prepolymerized material was added 10 parts by weight filler, 0.08 parts by weight of 1,6-hexanediol diacrylate, and 0.3 parts by weight benzoin i-propyl ether. This prepolymerized material, with the filler substantially homogenously dispersed therein, was sandwiched between two plates of Pyrex glass. The Pyrex glass was lined on the surface in contact with the mixture with release-treated Mylar film. The thickness of the sandwiched prepolymerized material layer was determined by spacers that held the glass plates in spaced-apart relationship. In this Example the thickness of the prepolymerized material layer, and hence the end matrix, was 35 mils. Air was eliminated from the system. The sandwiched prepolymerization material, containing the filler, further photoinitiator, and the diacrylate cross-linking agent, was then subjected to further irradiation from two UV sources which were lamps similar to that described above for the preparation of the prepolymerization material, which lamps were disposed above and below the glass plates at a distance of about one inch each. The exposure to the UV radiation continued 15 minutes, after which time the polymerization was completed. The glass plates were removed, leaving the polymerized layer lined with the mylar film on both sides to facilitate handling thereafter. The polymerized 35 mil. thick film is comprised of a crosS-linked polymer having about 61 mole percent butyl acrylate units, 21 mole percent 2-ethylhexylacrylate units, 18 mole percent acrylic acid units, and substantially homogeneously dispersed 9.5 wt. % filler. This film is suitable for cutting into any desired shape for use as a support layer for the adhesive system of the present invention. The filler was a 40 mole percent anionic polyacrylamide sieved through a 212 micron mesh sieve.

EXAMPLE 2

To an erlenmeyer flask was charged a mixture for preparing a prepolymerized material, which mixture, in parts by weight, was 58.7 parts butyl acrylate, 29.3 parts 2-ethylhexylacrylate, 12 parts acrylic acid, and 0.2 parts benzoin i-propylether. The prepolymerization was conducted as described above in Example 1, again irradiating the mixture until a Brookfield viscosity of about 3,000 cps was reached. To this prepolymerization material was added„with stirring, 0.05 parts by weight of 1,6-hexanediol diacrylate and 0.2 parts benzoin i-propylether. The prepolymerized material, with additional photoinitiator and crosslinking agent, was coated onto a strip of support material cut from the film produced in Example 1 above. Such coating was effectuated by dipping the strip of support material into the prepolymerized material and then holding the strip in an elevated position for several minutes to permit excess prepolymerized material to drain off. The coated support material was then placed between two glass Pyrex plates lined with Mylar film as before. Before dipping the support strip, the prior Mylar film had been removed from the strip after it was cut. For the coated strip, no spacers were used, the thickness of the strip with coating determining the diStance. between the plates. The sandwiched coated strip was then irradiated as described above in Example 1 for the second irradiation to complete the polymerization of the prepolymerization. This irradiation was continued for about ten minute, after which time the polymerization of the non-filled coating on the support strip was completed. The polymerized coating is a polymer comprised of about 58.4 mole percent butyl acrylate units, 20.3 mole percent 2-ethylhexylacrylate units, and 21.3 mole percent acrylic acid units. In comparison to the polymer of the filled support layer, it has less butyl acrylate units and more acrylic acid units, the amount of 2-ethylhexylacrylate units being about the same, and in addition it is less cross-linked than the polymer of the filled support layer.

EXAMPLE 3

Samples of the adhesive system prepared in Example 2 above were subjected to the Tensile Strength test, the Peel Test, break-away value ("Br") with and without a seven day prior aging at 70° C., and the Pluck Test without a prior aging and then with a seven day prior aging at 70° C. with room temperature and 70° C. pulls. Each of these tests are described above. The test results for Example 2's adhesive system, and a blank that was prepared as described in Examples 1 and 2 except that no filler was incorporated, are set forth below in Table I.

TABLE I

| Test | Test Results (lb) | | |
| --- | --- | --- | --- |
| | Blank | Example 2 | Percent Improvement* |
| Tensile Strength | 1.0 | 1.5 | 50.0% |
| Peel (Br) | 33.0 | 44.4 | 22.4% |

TABLE I-continued

| Test | Test Results (lb) | | |
|---|---|---|---|
| | Blank | Example 2 | Percent Improvement* |
| Peel (Br) 7 days/70° C.[1] | 43.0 | 60.0 | 39.5% |
| Pluck | 27.5 | 40.0 | 45.5% |
| Pluck 7 days/70° C.[1] | 53.5 | 66.25 | 23.8% |
| Pluck 7 days/70° C[2] 70° C. pull | 35.0 | 38.0 | 8.6% |

*Percent Improvement is the percentage increase in the test result of Example 2 over the Blank.
[1]Tested at room temperature.
[2]Tested at 70° C.

The test results set forth in Table I above also demonstrate that the samples subjected to the seven day accelerated aging at 70° C. had higher performance levels in the break-away Peel Test and the Pluck tests of respectively 48.5 percent and 65.5 percent increase for the samples of Example 2. In comparison, the Blank's performance also improved upon accelerated aging in the respective amounts of 30 and 94.5 percent increase, the aged blank, however, consistently still performing below that of Example's 2 sample.

EXAMPLES 4 to 7

Using the procedures described in Examples 1 and 2 above, and the same support material and coating polymer compositions, five adhesive systems were prepared differing only as to the amount and type of filler incorporated, as set forth below in Table II.

TABLE II

| Adhesive System Designation | Type of Filler | Amount of Filler (parts by weight) |
|---|---|---|
| Blank | none | none |
| Example 4 | 30 mole percent anionic polyacrylamide | 8 |
| Example 5 | acrylamide homopolymer | 12 |
| Example 6 | 98 percent hydrolyzed polyvinyl alcohol | 8 |
| Example 7 | polyethylene | 12 |

In all instances the fillers used were first passed through a 212 micron sieve mesh. The polyethylene of Example 7 had a 6 micron average particle size. Samples of each of these adhesive systems were subjected to the peel test and the pluck test, which tests are described above, and the test results are set forth in Table III below.

TABLE III

| Adhesive System | Peel Test (lb) | | Pluck Test (lb) |
|---|---|---|---|
| | Break-Away | Continuous | |
| Blank | 26.4 | 11.4 | 36.8 |
| Example 4 | 31 | 11.8 | 42.6 |
| Example 5 | 31 | 12.2 | 43.4 |
| Example 6 | 30 | 11.7 | 40.4 |
| Example 7 | 34.8 | 13.4 | 37.8 |

EXAMPLE 8

Using samples of the adhesive system prepared as described in Examples 1 and 2 above, the effect of passage of time at ambient room temperature ("dwell") was determined for performance in Peel Test, for dwells of respectively 16 hours and 3 days. The test results are set forth below in Table IV for duplicate tests.

TABLE IV

| Test | Example 2 16 hr. dwell | Example 2 3 day dwell | Percent Improvement* |
|---|---|---|---|
| Peel break-away | 34.3/28.7 | 41.5/40.0 | 30 |
| Peel continuous | 11.5/13.5 | 15.5/13.4 | 18 |

*Percent improvement is the percent increased performance of the sample dwelled three days over that given a 16 hour dwell, based on the average of percent improvement of the duplicate samples.

EXAMPLE 9

Using the procedures described in Examples 1 and 2 above, and the same polymer compositions described therein for the support material and adhesive coating, a number of adhesive systems were prepared using as the filler varying amounts of polyethylene. The polyethylene use is described in Example 7 above. Samples of these adhesive systems were subjected to accelerated aging (7 days at 70° C.) and then to the break-away and continuous Peel Test, and certain of them to the Pluck Test, conducted at room temperature and at 70° C. Duplicative samples of blanks were subjected also to each test. The blanks were adhesive systems prepared by the same procedures except no filler was incorporated. The results of the Peel Tests are set forth in Table V below. The results of the Pluck Tests are set forth in Table VI below. The polyethylene used in all instances was the commercially available Allied Signal Grade B-6 polyethylene having a particle size range of from 2 to 12 microns.

TABLE V

| Peel Test/7 day 70° C. Aging/Polyethylene Filler | | |
|---|---|---|
| Amount of Filler (parts by wt.) | (lb) Room Temp. Peel Break-away/continuous | (lb) 70° C. Peel Break-away/continuous |
| none | 26/18 | 14/9.5 |
| none | 29/18 | 12.9/9 |
| 12 | 51/19 | 15/14 |
| 14 | 50/19 | 16/14 |
| 16 | 44/20 | 15.7/12 |
| 18 | 51/20 | 17.5/14 |
| 20 | 48/18 | 15.2/14 |

TABLE VI

| Pluck Test/7 day 70° C. Aging/Polyethylene Filler | | | | |
|---|---|---|---|---|
| Amount of Filler (parts by wt.) | Average Pluck (lb) | | No. Samples Tested | Range of Pluck Values |
| | Rm. Temp. Pull | 70° C. Pull | | |
| none | 35 | | 5 | 33–37 |
| none | 44 | | 5 | 41–47 |
| 18 | 91 | | 5 | 87–96 |
| none | | 26 | 5 | 22–29 |
| none | | 25 | 5 | 22–28 |
| 20 | | 50 | 4 | 41–64 |

EXAMPLE 10

Using the procedures described in Examples 1 and 2 above, and the same polymer compositions described therein for the support material and adhesive coatings, a number of adhesives systems were prepared using as the filler varying amounts of cellulose, and samples thereof were subjected to the Pluck Test. The cellulose used in all instances were commercially available celluloses from one of three commercial sources. The particular cellulose used is designated either "A", "B", or "C"

according to commercial source. The results of the pluck test, including that for an. adhesive system prepared in the same manner but Without a filler, are shown below in Table VII.

TABLE VII

| Cellulose Filler | | |
|---|---|---|
| Amount (parts by wt.) | Source Designation | Pluck Value (lb.) |
| none | — | 32.4 |
| 10 | A | 46.4 |
| 12 | A | 46.7 |
| 14 | A | 46.7 |
| 10 | B | 41.0 |
| 12 | B | 45.4 |
| 14 | B | 48.4 |
| 10 | C | 44.4 |
| 12 | C | 44.1 |
| 14 | C | 43.8 |

Another preferred embodiment of the present invention is an adhesive system in which the pressure sensitive adhesive polymer of the filled support layer is comprised of from about 65 to 90 mole percent of non-tertiary acrylic acid alkyl esters formed of alcohols having from about 6 to about 12 carbon atoms, the remainder of the polymer being an ethylenically-unsaturated monomer unit containing at least one polar moiety, or a combination of such polar-moiety containing unit and a small amount of other monomer(s). A preferred polar moiety containing monomer unit is acrylic acid. Such filled support layer is preferably about from 25 to 45 mils in thickness, and further is coated on at least one side with an unfilled pressure sensitive adhesive layer of about from 1 to 5 mils in thickness, the pressure sensitive adhesive polymer of which similarly is comprised of from about 65 to 90 mole percent of non-tertiary acrylic acid alkyl esters formed of alcohols having from about 6 to about 12 carbon atoms, the remainder of the polymer being an ethylenically-unsaturated monomer unit containing at least one polar moiety, or a combination of such polar-moiety containing unit and a small amount of other monomer(s) that does not interfere significantly with the pressure sensitive adhesive properties. Preferably this adhesive system has as the pressure sensitive adhesive matrix of the filled support layer a pressure sensitive ahdhesive polymer comprised of from about 55 to about 65 mole percent 2-ethylhexyl acrylate, from about 15 to about 25 mole percent of octyl acrylate, decyl acrylate, or mixtures thereof, and from about 15 to 25 mole percent of an ethylenically-unsaturated polar-group containing monomer unit, which preferably is acrylic acid. Such filled support layer preferably contains from about 15 to about 25 percent organic particulate solids filler based on the weight of the pressure sensitive adhesive polymer comprising the adhesive matrix of the filled support layer. The filled support layer is preferably cross-linked, and may contain from about 1.0 to about 3.0 weight percent hydrophilic silica to facilitate uniform dispersion of the filler. The thinner, unfilled pressure sensitive adhesive layer(s) coated onto the support layer is comprised of from about 70 to about 80 mole percent of 2-ethylhexyl acrylate and from about 20 to 30 mole percent of an ethylenically-unsaturated polar-group containing monomer unit, which preferably is acrylic acid. The unfilled pressure sensitive adhesive layer(s) is preferably also cross-linked and more preferably cross-linked to a greater degree than the filled support layer. In further preferred embodiment, the adhesive system is comprised of such a filled support layer coated on both sides with such an unfilled pressure sensitive adhesive layer. This preferred embodiment, particularly when the organic particulate solids filler is polyvinyl acetate, is both strong and has a significant degree of adhesive agressiveness. It has a significantly high peel strength and high pluCk'strength. The higher acrylic acid alkyl esters employed are less volatile than those formed of lower molecule weight alcohols, for instance butyl acrylate, and hence in the manufacture of such adhesive system the polymerization may be.conducted fat a higher temperature than if such volatile monomers were present.

This preferred embodiment and other embodiments of the present invention may be partially or completed polymerized using photopolymerization, particularly with ultraviolet lamps. Such photopolymerization may be accomplished using middle wave U.V. lamps which emit a significant portion of their energy in the 280 to 350. nm wavelength band, such as tubular fluorescent sun lamps available from the Westinghouse Company under the trade designations of FS-20 or FS-40. Such photopolymerization may also be accomplished using other sources of U.V. radiation.

Another preferred method for the preparation of the adhesive system of the present invention is to apply a coating of prepolymerized material onto a sheet that is release coated and is disposed within a chamber. The chamber itself is purged with an oxygen-free gas, such as nitrogen, and an atmosphere of such oxygen-free gas is maintained in the chamber throughout the polymerization. The prepolymerized material is exposed to ultra violet radiation through at least one wall of the chamber to effectuate the polymerization. Such wall is conveniently the. upper wall ifpositioned above, and substantially in a parallel plane to, the prepolymerized material coating. Such wall must, of course, transmit sufficient ultra violet radiation for the polymerization of the prepolymer. For the preparation of the adhesive system in the form of an elongated strip of material, an elongated chamber may be employed with a bank of ultra violet lamps. The release coated sheet may be an elongated strip that moves through the chamber from one end to the other, under each of the lamps in the bank. If the adhesive system desired is comprised of filled support layer coated on at least one side with an unfilled adhesive layer, the entire adhesive system may be prepared in a single pass under the bank of lamps on a moving release coated sheet. For instance, at a first station a layer of the unfilled adhesive layer prepolymer may be applied to the release coated sheet as it moves past that station, and such prepolymer may be polymerized by exposure to the ultraviolet lamps that are positioned between such first station and a second station. At such second station, a layer of the filled support material prepolymer may be applied on top of the unfilled adhesive layer and be polymerized by exposure to the ultraviolet lamps that are positioned beyond such second station. If another unfilled adhesive layer is desired on top of the filled layer, one would merely provide a third station beyond the second station for its application. The speed at which the system moves under the lamps, and from station to station, would of course be chosen by the exposure time required for the completion of thepolymerization(s). If a continuous or semi-continuous process is desired, and the layers vary as to the time of exposure required to complete the polymerization, the distance between stations, and number of lamps positioned along such distance, is adjusted so that a given speed is sufficient for the polymerization desired between stations. Such preferred method is described more fully in Examples 11 and 12 below.

Although a number of materials, for instance pyrex, transmit at least some ultra violet radiation, a preferred material for use as the chamber wall that lies between the material being polymerized and the source of ultra violet radiation is quartz glass.

A convenient source of ultra violet radiation may be tubular fluorescent bulbs. When tubular flourescent ultra violet bulbs are used with the elongated polymerization chamber described above, they are conveniently positioned substantially side-by-side, the center line of the chamber being disposed substantially directly below the center of such tubes. If the width of the adhesive system being made is significantly less than the length of the bulbs, the bulbs may be each placed in a skewed position, so that each bulbs axis lies at anangle other than perpendicular to the chamber's length so as to utilize for polymerization purposes more of the radiation emitted along the length of the tube. In other words, the bulbs may be conveniently placed so that a significant portion of its radiation length is disposed above the material being polymerized. For a very narrow strip of the adhesive system, the most effective disposition of such tubular bulbs may be end-to-end above the chamber, rather than side-to-side.

EXAMPLE 11

An adhesive system of the present invention was prepared by photopolymerization using "UV-B" lamps as the source of ultraviolet radiation. Such lamps were 20 watt Westinghouse FS-20 lamps, which are two feet in length, and are described further as to spectral characteristics above. A mixture of 880 parts by weight 2-ethylhexyl acrylate, 120 parts by weight acrylic acid, and 1.0 part by weight Irgacure 651, was prepolymerized to a viscosity of from 1000 to 2000 cps (Brookfield viscometer) in a reaction vessel, by photopolymerization. The monomers and vessel were purged with nitrogen prior to the polymerization to remove oxygen, and the prepolymerization was accomplished by exposure to UV-B lamp radiation while the mixture was under constant agitation under a blanket of nitrogen atmosphere. Irgacure 651 is a photoinitiator (2,2-dimethoxy-2-phenylacetophenone) available under that tradename from Ciba-Geigy. This prepolymerized material was the adhesive layer prepolymer. In the same manner a carrier layer prepolymer was also prepared except that the prepolymerized mixture was comprised of 850 parts by weight of 2-ethylhexyl acrylate, 120 parts by weight of acrylic acid, 30 parts by weight of octyl/decyl acrylate, 20 parts by weight of Aerosil 200, and 1.0 part by weight of Irgacure 651, and this mixture was prepolymerized to a viscosity of 1500 to 3000 cps (Brookfield viscometer). The Aerosil 200 is an amorphous fumed silica, commerically available under that tradename from Degussa Corp. The subsequent complete polymerization of layers of such prepolymers was carried out on a movable line disposed within an elongated chamber, the upper wall of which was composed of quartz glass. Disposed above such chamber were a bank of the UV-B lamps. The chamber had a atmosphere of nitrogen provided by a source of nitrogen that had been first bubbled through a super-cooled isopropanol bath, so that the nitrogen not only excluded oxygen from the chamber, it also acted as a cooling means. The bank of lamps were divided into three polymerization zones, each of which zones were preceded by a station at which a layer of prepolymer was set down on the line. The first zone, an adhesive layer zone, was 12 feet long. The second zone, the carrier layer zone, was 21 feet long. The third zone, which was a second adhesive layer zone, was 17 feet long. The lamps were positioned at a density of about two lamps per foot of the line, and disposed centered and parallel to the line of the layers as they moved through the elongated chamber. The entire line, including both the polymerization zones and the stations at which the prepolymer layers were set down, was about 60 feet in length. At the stations the prepolymers were set down on the low-adhesion support belt within the chamber as the belt moved under the various prepolymer containers and the thickness of the prepolymer layers so formed was determined by doctor blades. The first prepolymer layer, an adhesive layer, was formed of the adhesive layer prepolymer to which was added 1.0 part by weight of Irgacure 651 and 0.6 parts by weight of 1,6 hexanediol diacrylate, and the layer set down was 3 mil thick. The carrier layer, which was set down over the polymerized first adhesive layer, was formed of the carrier layer prepolymer to which had been added 1.0 part by weight Irgacure 651, 0.3 parts by weight of 1,6 hexanediol diacrylate, and 100 partx by weight Vinac RP-251. Vinac RP-251 is a polyvinyl acetate described more fully above. The carrier layer prepolymer was a "filled" layer, and was set down at a thickness of 34 mils. The third layer, the second adhesive layer, was set down on top of the polymerized carrier layer at a thickness of 2–3 mils. The second adhesive layer had the same composition as the first adhesive layer; having been made from the same batch of adhesive prepolymer. The compositions of both the adhesive and carrier layer prepolymers given above, including the materials added after the prepolymerizations, are "batches" of prepolymers prepared for complete polymerization, and the relative amounts prepared in each batch is not indicative of the relative amounts used for a given length of adhesive system prepared. The lamps were disposed 6 inches above the adhesive system being polymerized, and the line speed was maintained continuously at 5 ft/min. A sample of the adhesive system so prepared was dried for a one hour period at a temperature of 350° F., and then cooled to room temperature and weighed; the loss of weight in such drying was 2.3 weight percent. Hence the adhesive system was determined to have been converted 97.7 weight percent from monomer to polymer.

EXAMPLE 12

The procedure set forth in Example 11 above was repeated except that instead of the UV-B lamps, "UV-A" lamps were used. Such UV-A lamps were 15 watt Sylvania F15T8-BLB lamps, which are 18 inches long. Such lamps were disposed 3 inches above the adhesive system being prepolymerized and the line speed was reduced to 4 ft./min. Other than these exceptions, all other process conditions, including formulations, lamp density, and the like, were the same as in Example 11 above. Using the same drying method, it was determined that the adhesive system had been converted 98.1 percent from monomer to polymer.

The octyl/decyl acrylate used in the above examples was a mixture of linear acrylates of $C_8$ and $C_{10}$ alkyl alcohols commercially available from Interez Co.

EXAMPLE 13

The adhesive systems prepared as described in Examples 11 and 12 above were subjected to the various performance tests described above, the results of which are set forth in Table VIII below.

TABLE VIII

| Test | Test Result | |
|---|---|---|
| | Adhesive System of Example 11 | Adhesive System of Example 12 |
| Pluck Test | 61.7 lbs | 48.5 lbs |
| Initial Breakaway Peel Test | 37.6 lbs | 34.7 lbs |
| Initial Continuing Peel Test | 19.1 lbs | 16.4 lbs |
| Creep Test (1000 gms) | No Slip | No Slip |

In the foregoing EXamples, all of the adhesive systems, including not only the filled support layer bug also the thinner adhesive coatings thereon, were about from about 35 to 40 mils thick. All of the fillers employed were in the particle size range of from about 2 to 212 microns.

INDUSTRIAL APPLICABILITY OF THE INVENTION

The present invention is applicable to the adhesive industry and industries employing bonding means, such as the automotive industry.

We claim:

1. A pressure-sensitive adhesive system consisting essentially of:
   a pressure-sensitive adhesive matrix;
   optionally from about 0.5 to about 5.0 weight percent of a thixotropic agent dispersed within said matrix;
   organic particulate solids having a particle size of from about 1 to about 300 microns,
   wherein said organic particulate solids are substantially homogeneously dispersed within said matrix as a filler and wherein said organic particulate solids are substantially comprised of organic composition having a molecular weight of at least 500; and
   optionally at least one coating of an unfilled pressure-sensitive adhesive material, said matrix being a support material for said coating,
   wherein said organic particulate solids are incorporated into said matrix in the amount of from 1 to 25 weight percent based on the total weight of said matrix and said organic particulate solids,
   wherein the adhesive system is formed as a sheet having a thickness of from 25 to 50 mils, and
   wherein said organic particulate solids are polyvinyl acetate.

2. A pressure-sensitive adhesive system essentially of:
   a pressure-sensitive adhesive matrix;
   optionally from about 0.5 to about 5.0 weight percent of a thixotropic agent dispersed within said matrix:
   organic particulate solids having a particle size of from about 1 to about 300 microns,
   wherein said organic particulate solids are substantially homogeneously dispersed within said matrix as a filler and wherein said organic particulate solids are substantially comprised of organic composition having a molecular weight of at least 500; and
   at least one coating of an untilled pressure-sensitive adhesive material, said matrix being a support material for said coatinc.
   wherein said pressure-sensitive adhesive matrix is comprised of from about 55 to 65 mole percent 2-ethylhexyl acrylate, from about 15 to about 25 mole percent of octyl acrylate, decyl acrylate, or mixtures thereof and from about 15 to about 25 mole percent of units having at least one polar group and derived from ethylenically-unsaturated monomer, and is cross-linked,
   wherein said untilled pressure-sensitive adhesive coating is comprised of from about 70 to 80 mole percent of 2-ethylhexyl acrylate and from about 20 to 30 mole percent of units having at least one polar group and derived from ethylenically-unsaturated monomers. and is cross-linked, and
   wherein said organic particulate solids are polyvinyl acetate.

3. A pressure-sensitive adhesive system consisting essentially of:
   a pressure-sensitive adhesive matrix;
   optionally from about 0.5 to about 5.0 weight percent of a thixotropic agent dispersed within said matrix:
   organic particulate solids having a particle size of from about 1 to about 300 microns,
   wherein said organic particulate solids are substantially homogeneously dispersed within said matrix as a filler and wherein said organic particulate solids are substantially comprised of organic composition having a molecular weight of at least 500; and
   at least one coating of an untilled pressure-sensitiVe adhesive material, said matrix being a support material for said coating,
   wherein said pressure-sensitive adhesive matrix is comprised of from about 55 to 65 mole percent 2-ethylhexyl acrylate, from about 15 to about 25 mole percent of octyl acrylate, decyl acrylate, or mixtures thereof, and from about 15 to about 25 mole percent of units having at least one polar group and derived from ethylenically-unsaturated monomer, and is cross-linked;
   wherein said untilled nressure-sensitive adhesive coating is comprised of from about 70 to 80 mole percent of 2-ethylhexyl acrylate and from about 20 to 30 mole percent of units having at least one polar group and derived from ethylenically-unsaturated monomers, and is cross-linked, and
   wherein said organic particulate solids are polyvinyl acetate,
   wherein said untilled pressure-sensitive adhesive coating is cross-linked to a greater degree than said pressure-sensitive adhesive matrix.

* * * * *

UNITED STATES PATENT AND TRADEMARK OFFICE
CERTIFICATE OF CORRECTION

PATENT NO. : 5,385,772

DATED : January 31, 1995

INVENTOR(S) : Slovinsky et al.

It is certified that error appears in the above-identified patent and that said Letters Patent is hereby corrected as shown below:

In column 1, line 7, delete "whichis" and substitute therefor -- which is --.

In column 2, line 35, delete "pressuresensitive" and substitute therefor -- pressure-sensitive --.

In column 2, line 63, delete "particulatessolids" and substitute therefor -- particulate solids --.

In column 3, line 58, delete "solration" and substitute therefor -- solvation".

In column 5, line 13, delete "moietycontaining" and substitute therefor -- moiety-containing --.

In column 5, line 32, delete "0,005" substitute therefor -- 0.005 --.

In column 7, line 8, delete "aftera" and substitute therefor -- after a --.

In column 8, line 33, delete "diStance" and substitute therefor -- distance --.

UNITED STATES PATENT AND TRADEMARK OFFICE
CERTIFICATE OF CORRECTION

PATENT NO. : 5,385,772
DATED : January 31, 1995
INVENTOR(S) : Slovinsky et al.

It is certified that error appears in the above-identified patent and that said Letters Patent is hereby corrected as shown below:

In column 8, line 38, delete "minute" and substitute therefor -- minutes --.

In column 12, line 7, delete "pluCk's" and substitute therefor --pluck--.

In column 12, line 11, delete "fat" and substitute therefor -- at --.

In column 12, line 36, delete "ifpositioned" and substitute therefor -- if positioned--.

In column 13, line 20, delete "anangle" and substitute therefor -- an angle --.

In column 15, line 56, after "system" insert -- consisting --.

In column 16, line 18, delete "untilled" and substitute therefor -- unfilled --.

In column 16, line 39, delete "untilled" and substitute therefor -- unfilled --.

In column 16, line 50, delete "untilled" and substitute therefor -- unfilled --.

UNITED STATES PATENT AND TRADEMARK OFFICE
CERTIFICATE OF CORRECTION

PATENT NO. : 5,385,772          Page 3 of 3
DATED     : January 31, 1995
INVENTOR(S) : Slovinsky et al.

It is certified that error appears in the above-indentified patent and that said Letters Patent is hereby corrected as shown below:

In column 16, line 50, delete "untilled" and substitute therefor -- unfilled --.

Signed and Sealed this

Eleventh Day of April, 1995

Attest:

BRUCE LEHMAN

Attesting Officer    Commissioner of Patents and Trademarks